US012671159B1

(12) United States Patent
Wrigley

(10) Patent No.: US 12,671,159 B1
(45) Date of Patent: Jun. 30, 2026

(54) MULTIBAND PISTON POLARIZER WAVEGUIDE ASSEMBLY INCLUDING COAXIALLY CONFIGURED INNER AND OUTER WAVEGUIDE CAVITIES

(71) Applicant: Lockheed Martin Corporation, Bethesda, MD (US)

(72) Inventor: Jason Stewart Wrigley, Littleton, CO (US)

(73) Assignee: LOCKHEED MARTIN CORPORATION, Bethesda, MD (US)

( * ) Notice: Subject to any disclaimer, the term of this patent is extended or adjusted under 35 U.S.C. 154(b) by 167 days.

(21) Appl. No.: 18/524,525

(22) Filed: Nov. 30, 2023

(51) Int. Cl.

| | |
|---|---|
| ***H01P 1/213*** | (2006.01) |
| ***H01P 1/165*** | (2006.01) |
| ***H01P 1/17*** | (2006.01) |
| ***H01P 5/20*** | (2006.01) |
| ***H01P 11/00*** | (2006.01) |

(52) U.S. Cl.
CPC ............ *H01P 1/2131* (2013.01); *H01P 1/165* (2013.01); *H01P 1/17* (2013.01); *H01P 5/20* (2013.01); *H01P 11/002* (2013.01)

(58) Field of Classification Search
CPC .......... H01P 1/2131; H01P 1/165; H01P 1/17; H01P 5/20
USPC ........................................ 333/21 A, 126, 135
See application file for complete search history.

(56) References Cited

FOREIGN PATENT DOCUMENTS

EP 3635811 B1 12/2021

*Primary Examiner* — Benny T Lee

(57) ABSTRACT

Provided herein are various enhancements for radio frequency feed structures for waveguide-fed antenna systems. A waveguide structure includes an outer waveguide cavity comprising radial ports and an outer aperture, and disposed coaxially about a piston polarizer element housing an inner waveguide cavity. The piston polarizer element comprises longitudinal ridges. The inner waveguide cavity comprises an axial port and an inner aperture disposed coaxially with the outer aperture.

20 Claims, 9 Drawing Sheets

MULTIBAND PISTON POLARIZER WAVEGUIDE ASSEMBLY INCLUDING COAXIALLY CONFIGURED INNER AND OUTER WAVEGUIDE CAVITIES

TECHNICAL BACKGROUND

Microwave radio frequency (RF) transmission and receiving systems are employed across a wide range of application areas, including satellite communications, terrestrial telecommunications, wireless data transmission, telemetry, surveillance, remote sensing and control, among other application areas. Often, RF transmit/receive circuitry is employed with various waveguide-based feed components which couple to aperture antenna elements. Aperture antennas are a form of RF antenna used for directed transmission and reception of various RF signals, employed in either direct-radiated arrays or in reflector antenna feed systems. When large quantities of aperture antennas are desired, such as in electronically steered arrays (ESAs), designing and assembling RF waveguide-based feed solutions between RF circuitry and radiative components presents many challenges. These challenges can be especially pronounced when high-density, low-cost, and low-profile arrays are desired, such as for deployment on constellations of satellites.

Often, separate receive and transmit arrays are employed with corresponding sets of waveguide-based feed components and aperture antennas, due in part to the challenges of waveguide integration and manufacturing. However, these approaches suffer from large stackup dimensions, joint misalignment issues, potential asymmetric mating forces, and unwanted RF losses, especially when large arrays of dozens or hundreds of apertures are required. Waveguides and associated RF feed elements can be difficult to design and manufacture due to the high sensitivity of waveguides to manufacturing precision, symmetry, and geometric configurations which can lead to distortions like passive intermodulation (PIM). Moreover, the waveguide structures themselves can have bandwidth limitations related to corresponding geometries and manufacturing techniques. Thus, manufacturability and density of packaging are two areas that can be very challenging when trying to maintain performance in arrayed microwave RF systems.

In addition to passive RF conduits, waveguides can be used to form various RF components which can alter or redirect the propagated signals based on frequency or wavelength, polarization, amplitude, phase, and other characteristics. Example waveguide-based RF components can include orthomode transducers (OMTs), polarizers, filters, couplers, hybrid couplers, magic tees, and the like. However, waveguide feed networks that include several RF components are typically manufactured as independent RF components which are then joined into a larger assembly with fasteners or welds (or even using individual split-plane components that have two or more sub-assemblies forming each RF component). For example, existing solutions for RF feed networks can have high complexity and part counts numbering in the dozens of sub-assemblies.

One such example includes a high-complexity double quadrature junction (QJ) design which is paired with a septum polarizer. Quadrature junctions or hybrid couplers can split propagating RF signals into equal portions with outputs 90° apart in phase (i.e., quadrature), or may instead combine two RF signals while maintaining high signal isolation. QJs are often employed with (or as) orthomode transducers (OMTs) which act as duplexers to separate or combine orthogonal (e.g., vertical and horizontal) signal polarizations among different ports with respect to a common or shared port.

SUMMARY OF THE INVENTION

Provided herein are various enhancements for microwave radio frequency feed structures for waveguide-fed antenna systems. In particular, the examples herein provide for a multiband "piston" polarizer structure which can be configured to handle at least two concurrent RF feeds, such as X band and Ka band, among others. A magic tee and polarizer waveguide arrangement is provided for a first RF band using a single polarization, and a coaxial pass-through in the piston polarizer can be provided for a second RF band. The formation of the aforementioned waveguide structures can include forming a monolithic additive manufactured (e.g., 3D printing) part that includes all waveguide structures, or alternatively, machining of a separate hollow piston polarizer which fits into a waveguide cavity.

In one example implementation, a waveguide structure includes an outer waveguide cavity comprising radial ports and an outer aperture, and disposed coaxially about a piston polarizer element housing an inner waveguide cavity. The piston polarizer element comprises longitudinal ridges. The inner waveguide cavity comprises an axial port and an inner aperture disposed coaxially with the outer aperture.

In another example implementation, an assembly includes a polarizer portion comprising an outer waveguide cavity comprising radial ports and an outer aperture, and disposed coaxially about a piston polarizer element housing an inner waveguide cavity. The piston polarizer element comprises longitudinal ridges. The inner waveguide cavity comprises an axial port and an inner aperture disposed coaxially with the outer aperture. The assembly also includes a magic tee portion comprising a difference port, a sum port, colinear ports, and a magic tee waveguide cavity housing an impedance matching element. The assembly also includes recombination arms coupling the collinear ports of the magic tee portion to the radial ports of the polarizer portion.

In yet another example implementation, a method includes forming a polarizer portion comprising an outer waveguide cavity comprising radial ports and an outer aperture, and disposed coaxially about a piston polarizer element housing an inner waveguide cavity. The method includes forming the piston polarizer element comprising longitudinal ridges, and forming the inner waveguide cavity comprising an axial port and an inner aperture disposed coaxially with the outer aperture. The method also can include forming a magic tee portion comprising a difference port, a sum port, and colinear ports, and forming a magic tee waveguide cavity housing an impedance matching element. The method can also include forming recombination arms coupling the collinear ports of the magic tee portion to the radial ports of the polarizer portion.

This Overview is provided to introduce a selection of concepts in a simplified form that are further described below in the Detailed Description. It may be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure can be better understood with reference to the following drawings, where like features are denoted by the same reference labels throughout the detailed description of the drawings. While several implementations are described in connection with these drawings, the disclosure is not limited to the implementations disclosed herein. On the contrary, the intent is to cover all alternatives, modifications, and equivalents.

DETAILED DESCRIPTION OF THE INVENTION

Figure 1:
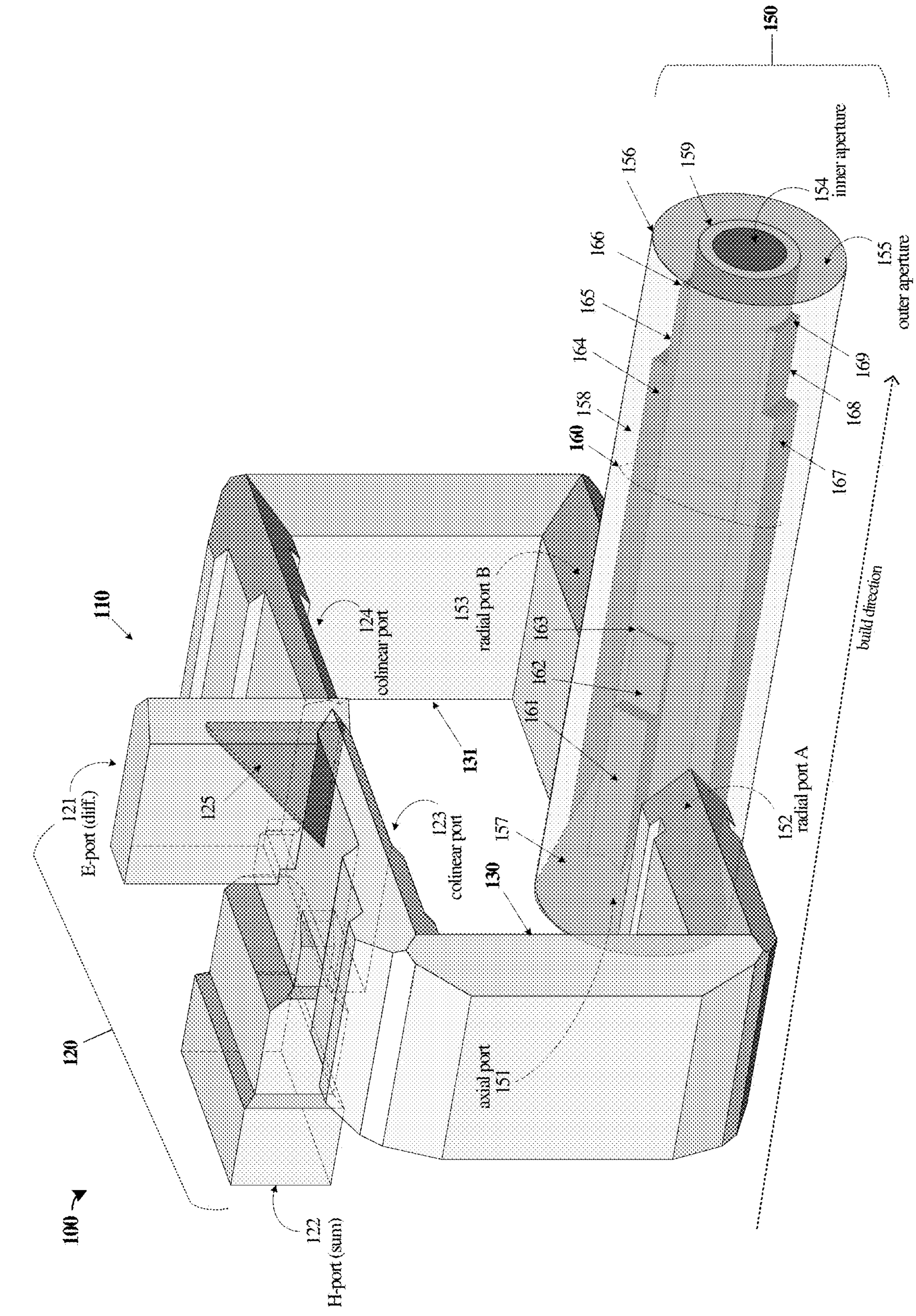
FIG. 1 illustrates a radio frequency feed structure in an implementation.

Provided herein are various enhancements for microwave radio frequency (RF) feed structures for waveguide-fed antenna systems. In particular, the examples herein provide for a multiband "piston" polarizer structure which can be configured to handle two concurrent RF feeds, such as X band (approximately 7 gigahertz, abbreviated GHz herein) and Ka band (approximately 40 GHz), among other frequency ranges and bands. An integrated magic tee and polarizer waveguide arrangement is provided for a first RF band, with a coaxial pass-through provided for a second RF band. The RF feed structures discussed herein can be coupled to a coaxial aperture antenna, such as a coaxial horn antenna, to provide concurrent multiband transmit (Tx) and receive (Rx) operations. This advantageously provides for a compact physical envelope which can be deployed on various spacecraft, satellites, vehicles, endpoint devices, and terrestrial applications. Moreover, a tight packaging arrangement can be established with large arrays of aperture antennas, such as employed in electronically steered arrays (ESAs).

The formation of these waveguide structure implementations can include forming a monolithic assembly, or single integrated workpiece, which can be additively manufactured (e.g., 3D printing) to include corresponding waveguide feed structures. Additive manufacturing (AM) techniques can include various manufacturing processes suitable for metal or metal alloy materials such as Direct Metal Laser Sintering (DMLS), stereolithography (SLA), selective laser sintering (SLS), among others. Other examples include polymer or non-conductive material 3D printing which then have RF-contacting surfaces coated, plated, or deposited with layers of conductive material. Thus, while the specific AM techniques employed can vary, the enhanced waveguide structures discussed herein can provide desired performance over selected frequency ranges. It should be understood that other manufacturing techniques can be employed, but the structures described herein provide for the added capability of using AM techniques.

As mentioned, RF waveguide feed networks can be coupled to antenna apertures, such as horn apertures, to produce desired signal routing and phase shifting among transmit (Tx) and receive (Rx) ports. Example RF waveguide components, which can be implemented with waveguide structures, include polarizers, magic tee elements, couplers or hybrid couplers, filters, recombination elements, and other components. Based on selected geometries and connections, these RF waveguide components can establish impedance matching and isolation among various ports, and operate over selected frequency ranges.

Various terms are employed herein to describe RF structures and waveguide elements. The electric plane, or E-plane, is a plane defined by the direction of a transverse electric field in a waveguide. Often, this corresponds to a vertical axis along a waveguide. The magnetic plane, or H-plane, is a plane defined by the direction of the transverse magnetic field in a waveguide. Often, this corresponds to the horizontal axis along a waveguide. Also, the term port can be applied to a junction, joint, or subdivision between two waveguide components or subassemblies, or as a junction between a conductive link (e.g., coaxial cable) and a radiative (e.g., waveguide) link. Some ports can be coupled to a particular configuration of the E-plane or H-plane, referred to as "E-plane ports" (or "E-ports"), and "H-plane ports" (or "H-ports"). The term aperture can relate to a port which further couples to radiative RF components, such as an aperture antenna or other similar element. Port and aperture terminology can be used interchangeably herein.

Figure 6:
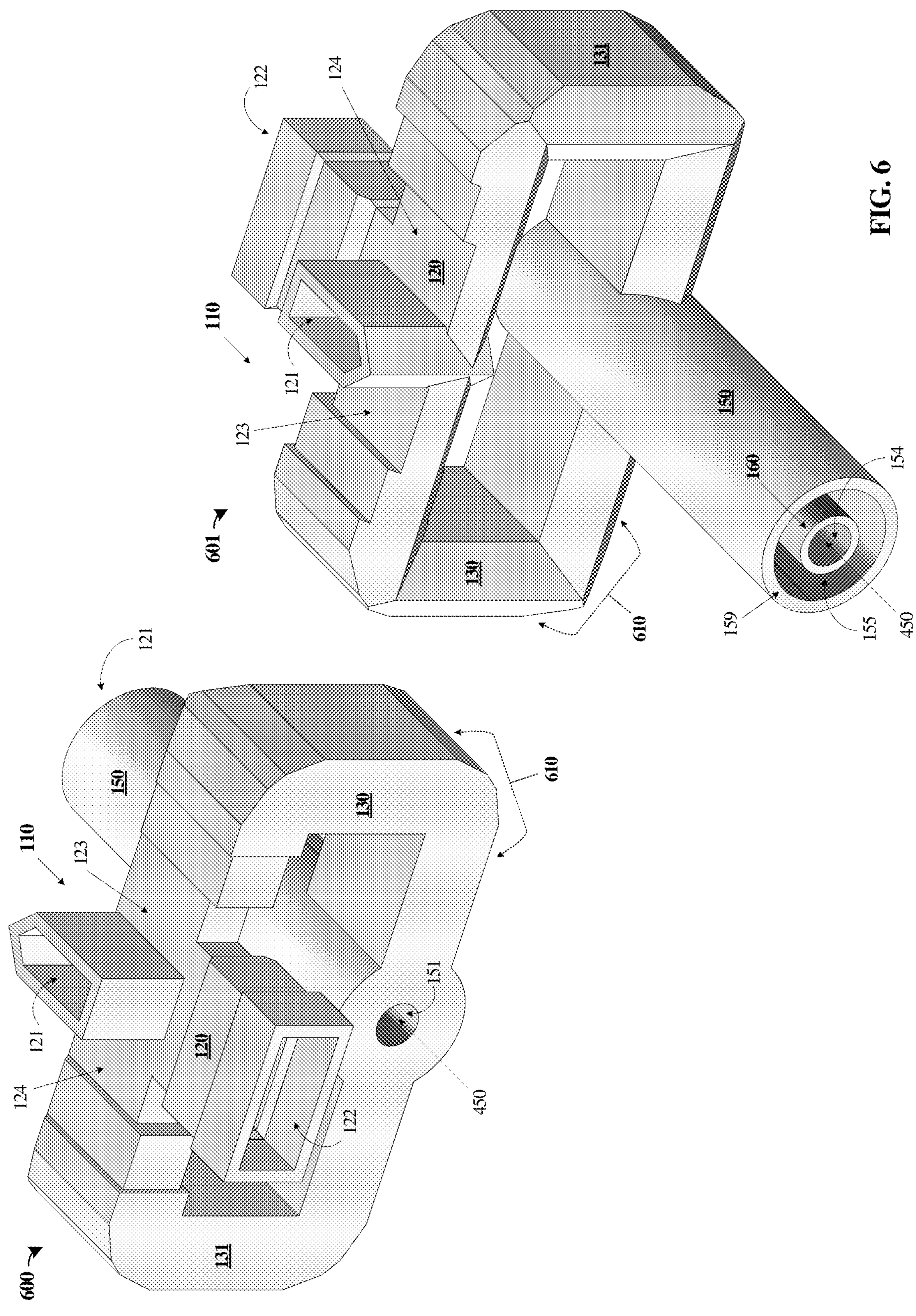
FIG. 6 illustrates a manufactured view of a radio frequency feed structure in an implementation.

Turning now to a first example waveguide structure, FIG. 1 is presented. FIG. 1 includes view 100 which shows an isometric view of a waveguide air cavity for waveguide structure 110. In addition to air cavity elements, some internal manufactured elements are included, namely element 125 and 160. An air cavity view comprises the volume or space internal to waveguide walls or other RF structure, such that the view shows cavities, spaces, channels, conduits, or other features through which RF energy can propagate or resonate. In contrast, manufactured views (such as seen in FIG. 6) show various material provided that form walls or structures around the air cavities, with conductive surfaces typically in contact with the air cavities. Variations on the manufactured implementation can be employed based on application, and thus the air cavity view provides an illustration of the functional or RF-active portions of a waveguide structure.

Turning now to the features illustrated in FIG. 1, view 100 shows waveguide structure 110. Waveguide structure 110 includes several component parts or sub-assemblies which can be integrated into a monolithic assembly structure, namely magic tee portion 120, recombination arms 130-131, and polarizer portion 150. The configuration shown in FIG. 1 provides for a monolithic and fully 3D printed feed network. Furthermore, magic tee portion 120 includes triangular impedance matching element 125 which provides impedance matching among ports 121 and 122, as well as enhanced manufacturability for 3D printing techniques. Advantageously, waveguide structure 110 provides for reductions in cost, time to manufacture, mass, and supports manufacturing using various AM techniques that are unsuitable for conventional waveguide feed networks.

Waveguide structure 110 can be employed in transmit (Tx) or receive (Rx) operations, with various polarizations. Typically, an aperture antenna is coupled to one end of waveguide structure 110, which is then configured to transmit or receive propagated RF energy. Due to the coaxial configuration of apertures 154-155 of waveguide structure 110, a corresponding coaxial aperture antenna configuration can be employed, such as a horn element embedded coaxially with another horn element, among other configurations. Thus, waveguide structure 110 provides for multiband operation by way of the aforementioned coaxial arrangement of polarizer portion 150. The propagation modes for the outer coaxial shell (158) that feeds outer aperture 155 and the inner coaxial waveguide that feeds inner aperture 154 are both TE11. The outer shell supports also the TEM mode which in this case is an unwanted propagation mode. To avoid this unwanted mode, the configuration in FIG. 1 is provided to excite orthogonal TE11 modes and do so by mating symmetrically at radial ports 152-153.

In operation, a first Tx RF band can be carried by waveguide structure 110, with left-hand circular polarization (LHCP) or right-hand circular polarization (RHCP) RF signals fed to one or more ports of magic tee portion 120 which then propagate through collinear ports 123-124 and recombination arms 130-131 for further propagation to a downstream polarizer portion 150 at radial ports 152-153, emission at outer aperture 155, and transmission by an antenna aperture (not shown for clarity). Receive (Rx) operations can have RF energy received by an antenna aperture (not shown for clarity), presented to outer aperture 155, and propagated though polarizer portion 150 to recombination arms 130-131 for handling by magic tee portion 120. Further RF components can be coupled to magic tee portion 120, such as upstream RF feed components, RF amplifiers, filters, modulators, and various RF communication circuitry. For magic tee portion 120, when a Tx RF signal is fed through sum port 122, outputs of equal magnitude but opposite phase (e.g., 180 degrees out of phase) are provided at collinear ports 123-124 and recombination arms 130-131, and the output of difference port 121 has zero power (in the ideal case) and can be terminated by an RF load to absorb any imbalances due to manufacturing tolerances.

In further examples, magic tee portion 120 with integrated impedance matching element 125 provides, when difference port 121 is excited over a selected frequency range, sum port 122 receiving corresponding RF energy under a first threshold energy, typically close to zero energy (within manufacturing tolerances). Likewise, magic tee portion 120 with integrated impedance matching element 125 provides, when sum port 122 is excited over the selected frequency range, difference port 121 receiving corresponding RF energy under a second threshold energy, typically close to zero energy (within manufacturing tolerances).

Recombination arms 130-131 couple between radial ports 152-153 and colinear ports 123-124 of magic tee portion 120. Recombination arms 130-131 comprise generally rectangular waveguide conduits or waveguide cavities that establish generally ‘C’ or ‘U’ shaped structures to position magic tee portion 120 above and in parallel with polarizer portion 150. Other configurations of recombination arms 130-131 are possible, with different angles or connection routes. Recombination arms 130-131 couple to colinear ports 123-124 of magic tee portion 120 and can be configured to excite the orthogonal TE11 modes in a downstream component, such as polarizer portion 150, and thus can mate symmetrically between magic tee portion 120 and polarizer portion 150. It should be understood that other propagation modes can be supported.

Polarizer portion 150 includes piston polarizer element 160 housed in an outer (coaxial) waveguide cavity 158 (also referred to as an outer shell). Outer waveguide cavity 158 has radial ports A and B (152-153) and outer aperture 155. Outer aperture 155 is coaxial about inner aperture 154 and separated by material that forms piston polarizer element 160, namely polarizer floor 159. Piston polarizer element 160 is generally hollow and houses an inner (coaxial) waveguide cavity which couples axial port 151 to inner waveguide aperture 154. Piston polarizer element 160 also includes several longitudinal ridges 161, 164, and 167, with an additional ridge hidden from view and positioned 180 degrees opposite to that of ridge 161 on piston polarizer element 160.

Piston polarizer element 160 comprises a hollow, phase-shifting and power splitting ridged piston structure positioned within polarizer portion 150. Piston polarizer element 160 can be configured to include no undercuts in the formation of the various structures, making it vertically 3D printable (or top machinable), as will be discussed in FIG. 5. Piston polarizer element 160 includes a conical segment 157 which couples and cantilevers piston polarizer element 160 from the floor of the waveguide cavity of polarizer section 150. When used in concert with recombination arms 130-131 and radial ports 152-153, outer waveguide cavity 158 and piston polarizer element 160 recombines RF signals split by magic tee portion 120 at the colinear ports.

The dominant coaxial modes are phase shifted by piston polarizer element 160 using longitudinal ridges formed along the length of piston polarizer element 160. Four ridges are included, two (2) longer and two (2) shorter. The longer two ridges, namely ridges 164 and 167, provide phase shifting, and the shorter two ridges, namely ridges 161 and the ridge hidden from view, provide power split handling. The ridges include stepped transitions from an initial height off of piston polarizer element 160 to eventually merge with piston polarizer element 160. Longitudinal ridge 161 has stepped feature 162 and terminal point 163. Longitudinal ridge 164 has stepped feature 165 and termination point 166. Longitudinal ridge 167 has stepped feature 168 and termination point 169. The mating of magic tee portion 120 to polarizer portion 150 occurs at 180° offset to excite desired waveguide propagation modes, such as TE11 with a single polarization, by symmetric placement of radial ports 152-153. This configuration also avoids unwanted coaxial TEM modes of propagation. The phase shifting performed by piston polarizer element 160 provides a 90° phase shift to establish circular polarization at outer waveguide aperture 155.

The lengths of the longitudinal ridges on piston polarizer element 160 can vary based on application, RF frequency ranges, and be tuned by empirical operation or simulated performance. Typically, the lengths are targeted to meet various functional parameters of piston polarizer element 160. For example, the long ridges (e.g., 164 and 167) are selected to be as short as possible to achieve the desired phase shift (e.g., 90°), and the short ridges (e.g., 161) are selected to be as short as possible to achieve the desired power split, although variations are possible. Also, the length and depth of the ridges are selected to support a desired bandwidth. For example, deeper ridges might be shorter, and shallower ridges might be longer, for a given bandwidth. Also, to achieve a broader bandwidth, shallower ridges might be selected to better match over a larger set of frequencies.

Piston polarizer element 160 might be clocked or rotated within polarizer portion 150 (e.g., within outer aperture 155) to arbitrary angles (e.g., +/−) 90° in order to achieve either LHCP or RHCP over the selected frequency range. In some examples, piston polarizer element 160 is manufactured in a fixed selected position with respect to radial ports 152-153. However, other examples might have piston polarizer element 160 in a movable or rotatable configuration (see end view 401 “rotate”), such as with a coupling mechanism, such that piston polarizer element 160 can be rotated about conical segment 157 to provide selectable orientations. A motor, servo, gearing mechanism, or other element can be included, along with corresponding control elements, to provide this selectable rotation.

Turning now to operation for a second RF band handled by waveguide structure 110, piston polarizer element 160 provides an inner hollow waveguide (between inner waveguide aperture 154 and axial port 151) for pass-through of the second band RF signals. Although not required, a feed network can be attached to waveguide structure 110 at axial port 151. This inner waveguide cavity provides for propagation of a second RF band, typically of a higher frequency than the first RF band carried by outer waveguide cavity 158.

Figure 2:
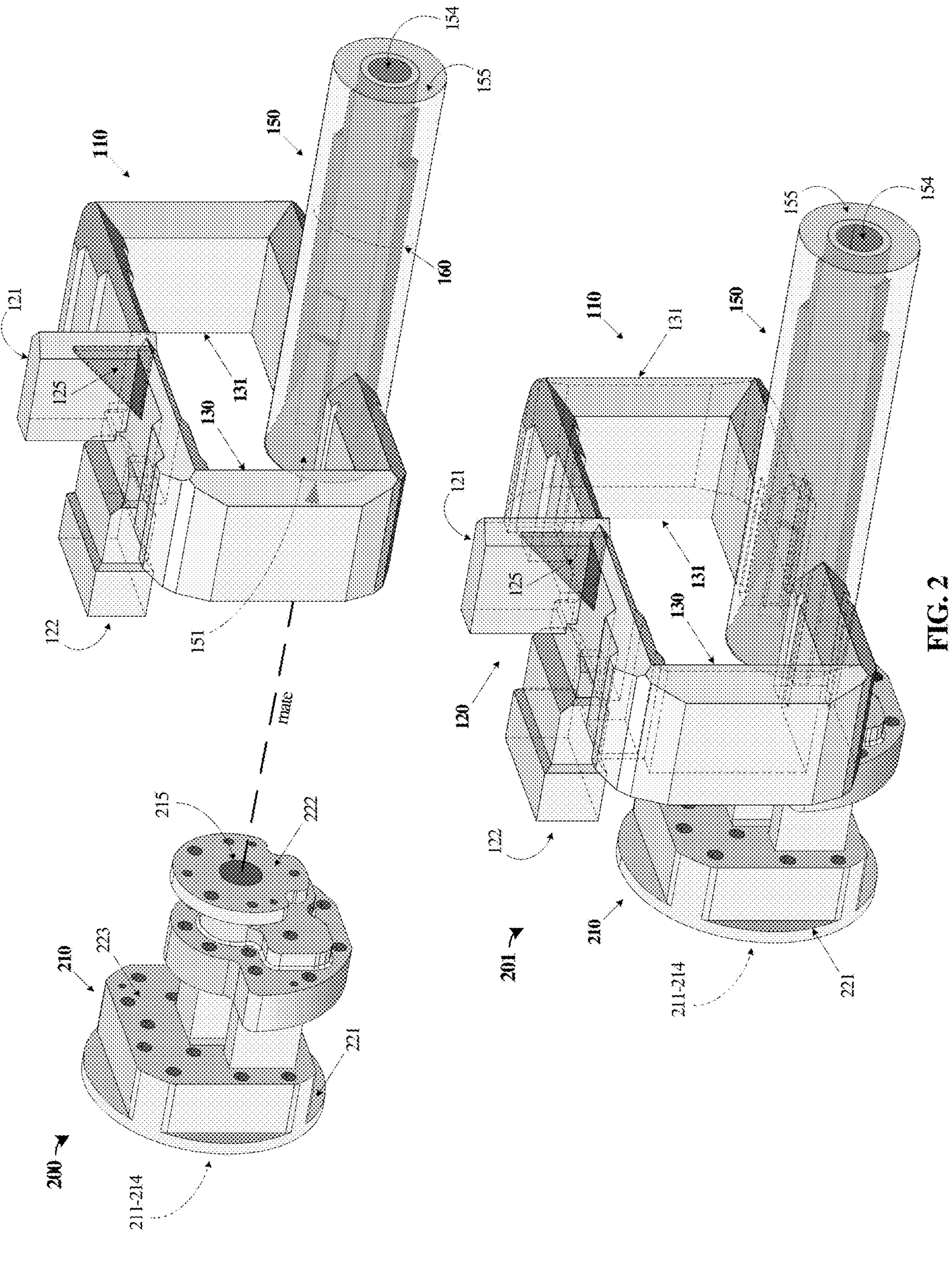
FIG. 2 illustrates a radio frequency feed structure assembly in an implementation.
Figure 3:
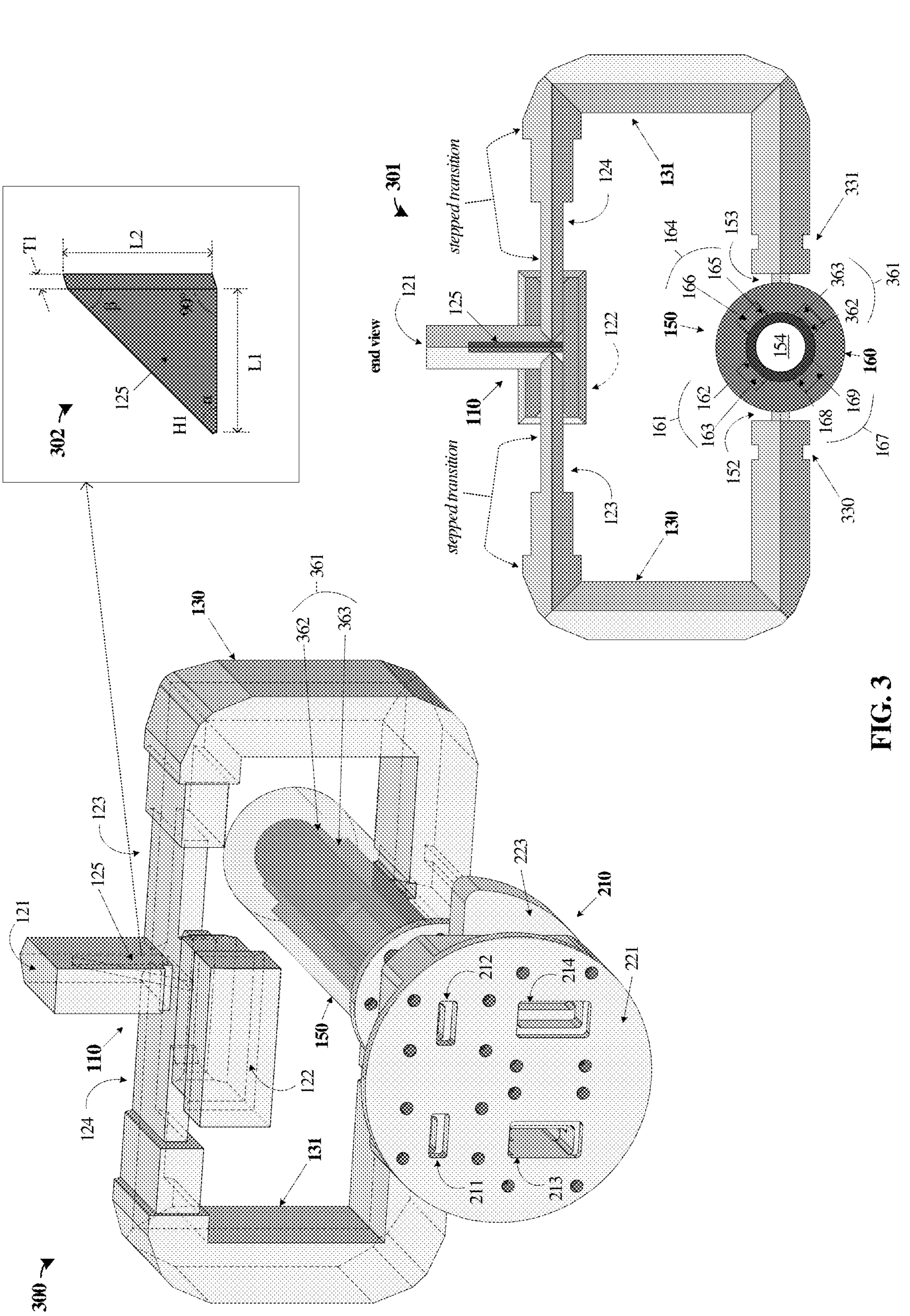
FIG. 3 illustrates a radio frequency feed structure assembly in an implementation.

To further illustrate waveguide structures for this second RF band, as well as further views of waveguide structure 110 in general, FIGS. 2 and 3 are presented. FIG. 2 includes view 200 showing a first subassembly view of feed network 210 and waveguide structure 110, with waveguide structure 110 comprising similar elements discussed above for FIG. 1. View 201 shows an assembled view which has feed network 210 coupled to axial port 151 of waveguide structure 110. Although any suitable feed network can be employed, feed network 210 is included as an exemplary structure which can couple RF signals from external waveguide conduits to axial port 151 of waveguide structure 110. Feed network 210 includes network body 223 housing various waveguide structures and RF elements, such as junctions, polarizers, couplers, ports, flanges, and other various elements. An entire length for the assembly including feed network 210 and waveguide structure 110 might be 5.7 inches, with diameters of outer aperture 155 and inner aperture 154 dependent on the frequency bands and reflection and power requirements of the frequency bands.

Feed network 210 includes flange 221 and 222 for coupling to other waveguide structures. Various fasteners or junction techniques can be employed to merge feed network 210 with waveguide structure 110, such as flanges, welds, friction-fit, and connectors, among others. In further examples, feed network 210 might be additively manufactured as a monolithic part with integrated waveguide structure 110. Feed network 210 includes feed port 215 associated with flange 222 and source ports 211-214 associated with flange 221. When feed network 210 is coupled to waveguide structure 110, various Tx and Rx signals can be coupled through feed network 210 and the inner coaxial waveguide of waveguide structure 110 for further coupling to an aperture antenna at inner waveguide aperture 154.

View 300 of FIG. 3 shows an isometric rear view of the assembly formed from feed network 210 and waveguide structure 110. Ports 211-214 are visible in view 300, which are formed into flange 221 and lead into an interior waveguide cavity or cavities of feed network 210. In this example, port 211 corresponds to a WR34 waveguide size and is configured to carry RHCP Rx signaling from 30.0-31.0 GHz. Port 212 corresponds to a WR34 waveguide size and is configured to carry LHCP Rx signaling from 30.0-31.0 GHz. Port 213 corresponds to a WR51 waveguide size and is configured to carry LHCP Tx signaling from 20.2-21.2 GHz. Port 214 corresponds to a WR51 waveguide size and is configured to carry RHCP Tx signaling from 20.2-21.2 GHz. It should be understood that other waveguide sizes and frequency ranges can be employed.

View 301 also shows an end view of waveguide structure 110 which has visibility to all four (4) longitudinal ridges on piston polarizer element 160. Specifically, phase shifting longitudinal ridges 164 and 167 are shown as being on opposing angular sizes of piston polarizer element 160, and power splitting longitudinal ridges 161 and 361 are shown as being on opposing angular sizes of piston polarizer element 160. Longitudinal ridge 361 also has stepped feature 362 and terminal point 363.

FIGS. 2 and 3 also show an internal wireframe view of waveguide structure 110, revealing internal details of the various waveguides, ports, and associated structures. In particular, views 200, 201, and 300 show features of impedance matching element 125 of magic tee portion 120 as well as cross-sectional shapes of various ports on magic tee portion 120.

As mentioned above, magic tee portion 120 includes a difference port (E-plane port or E-port) 121, sum port (H-plane port or H-port) 122, and two collinear ports 123-124. For magic tees, when the difference and sum ports are impedance matched, then the two collinear ports are ‘magically’ matched and isolated from each other (according to symmetry and conservation of energy). In other examples, exciting the E-port results in a 180-degree phase shift between split signals, with the H-port at a 0-degree phase shift, or conversely, exciting the H-port results in a 180-degree phase shift between split signals, with the E-port at a 0-degree phase shift.

Magic tees can incorporate an internal impedance matching structure to provide impedance matching among the magic tee ports. In conventional examples, such as traditional electroformed magic tee elements, this internal matching structure takes the form of a thin and tall cylindrical rod or post having a rotationally symmetric conical or stepped base that is provided internal to the magic tee waveguide cavity. In other examples, a rectangular ridge is provided at the H-plane port, however this comes with limitations on which specific ports can be driven. In yet other examples, impedance tuning is achieved using moveable cylindrical rods or movable threaded rod elements which protrude into the magic tee waveguide cavity. However, these existing magic tee configurations do not lend themselves to additive manufacturing processes, or vertical layered 3D printing techniques. Specifically, the internal matching structures and external walls of traditional magic tee structures do not allow monolithic “single-workpiece” additive manufacturing. For example, the various rods or posts cannot be printed in a horizontal orientation without support structures added internal to a waveguide cavity which then requires extensive post-processing to remove such support structures. This precludes 3D printing a magic tee structure with an internal impedance matching element in a vertical direction defined by starting at the sum port and working ‘upwards’ to the difference/colinear ports.

Magic tee portion 120 thus includes triangular impedance matching structure 125. Moreover, impedance matching element 125 is shown having a thickness and leg lengths L1 and L2. In this example, a face/side of impedance matching element 125 corresponding to L2 is attached to the floor or wall of the waveguide cavity along the entire length L2, while the leg/side of impedance matching element 125 corresponding to L1 is floating or unattached to any side/wall of the waveguide cavity. In this manner, two sides/faces of impedance matching element 125 (L1 and the side corresponding to hypotenuse H1) remain unattached or mechanically floating with respect to walls of the waveguide cavity forming waveguide structure 110.

From each port, a corresponding waveguide passage leads to a central portion of the waveguide cavity of magic tee portion 120 which houses impedance matching element 125. Additionally, port 121 has a pentagonal cross-sectional shape with a portion having shorter sides than the remaining sides of the pentagonal shape, forming a steeple configuration. Likewise, colinear ports 123-124 have pentagonal cross-sectional shapes with portions having shorter sides than the remaining sides of the pentagonal shapes. Port 122 has a rectangular cross-sectional area in this example. Thus, three of the ports of magic tee portion 120 have pentagonal cross-sectional configurations and one of the ports has a rectangular cross-sectional configuration. Port 122 can be sized to support a selected frequency range, such as the X band, with a waveguide junction supporting various rectangular waveguides. In one example, this includes a WR112 waveguide size/interface. Port 122 can be used for transmit or receive operations, but for example Rx operations, port 122 might carry one among RHCP or LHCP signals from 7.90-8.40 GHz.

Figure 5:
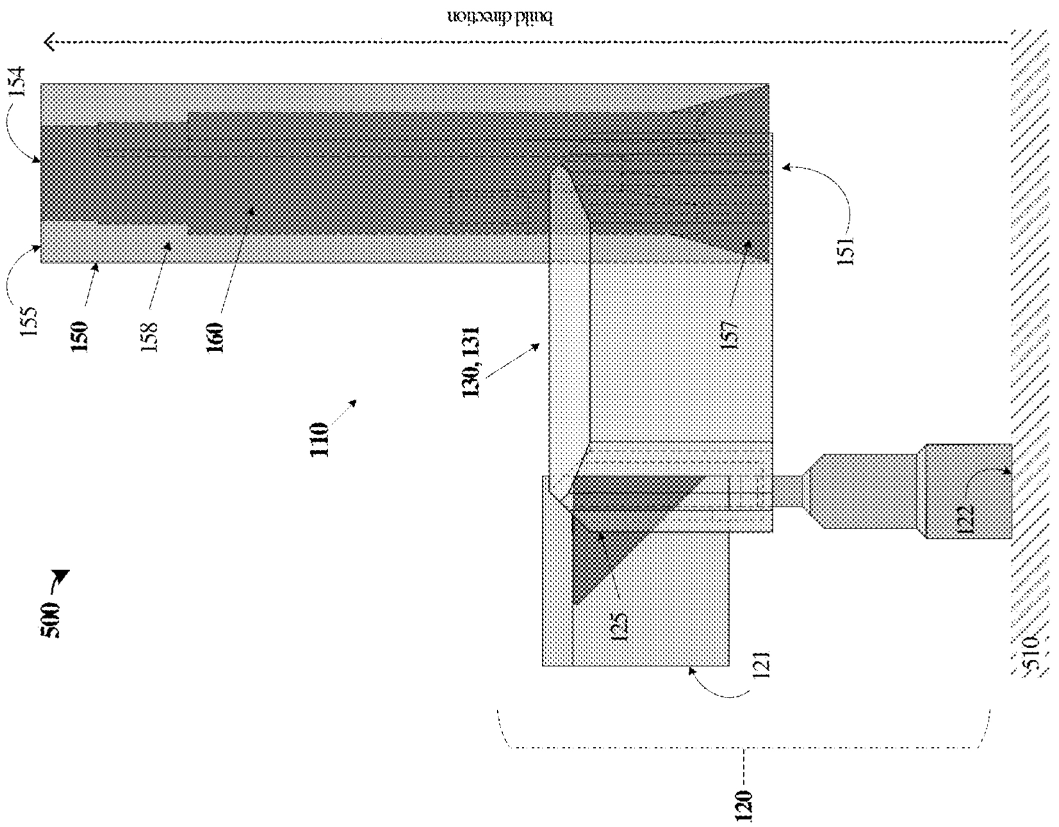
FIG. 5 illustrates a radio frequency feed structure in an implementation.

The steeple-shaped pentagonal cross-sections of ports 121 and 123-124 can provide enhanced manufacturability for certain AM techniques and manufacturing build directions (such as those noted in FIG. 1 and FIG. 5). The pentagonal cross-sections employed herein for various ports can include irregular (but bilaterally symmetric) pentagons having two longest sides generally parallel to each other, with two additional sides of equal length and shorter than the parallel sides, and one final side spanning the same distance as the two additional sides. Thus, the pentagonal shape has a generally rectangular envelope, with three sides joined with right angles (approximately 90°) and two sides joined by acute angles (e.g., approximately 45°). However, various cross-sectional shapes might be employed, such as rectangular, square, hex, pentagonal, circular, triangular, irregular, and others.

Recombination arms 130-131 can continue this pentagonal/steeple shape to radial ports 152-153. The steeple portion of the cross-section for recombination arms 130-131 can be seen in view 301 of FIG. 3, with the flat portion of the cross-section for recombination arms 130-131 seen in view 300 of FIG. 3. Also seen in view 300 is the change in cross-sectional width from colinear ports 123-124 to recombination arms 130-131 over a stepped transition in cross-sectional area. Recombination arms 130-131 furthermore include two 90° bends (each) and eventually are routed to radial ports 152-153. Discontinuities 330-331 can be optionally included near radial ports 152-153 to transition from a cross-sectional area of recombination arms 130-131 to a cross-sectional area of radial ports 152-153. These discontinuities can assist in impedance matching and reflection prevention among recombination arms 130-131 and radial ports 152-153.

Also seen in FIG. 3 are further views of magic tee portion 120, with some internal features visible using a wireframe representation. Furthermore, detailed inset 302 provides some dimensional labeling for impedance matching element 125. For magic tee portion 120, when an RF signal is fed through sum port 122, outputs of equal magnitude but opposite phase (e.g., 180 degrees out of phase) are provided at collinear ports 123-124, and the output of difference port 121 has zero power (in the ideal case). Thus, for an example transmit (Tx) operation, an RF signal provided to sum port 122 establishes a power split and phase shift over collinear ports 123-124. Colinear ports 123-124 can be further coupled to upstream/downstream RF components/elements, such as recombination arms, waveguides, filters, polarizers, hybrid couplers, orthomode transducer (OMT), aperture antenna elements, or other components. When used in recombination networks, magic tees can compensate for certain amounts of waveguide length mismatches by having an impedance load coupled to port 121 or port 122. For example, an impedance load coupled to port 121 (not shown) can dissipate energy/power arising from any minor mismatches in lengths among various links or waveguide cavities of magic tee portion 120 or upstream/downstream of magic tee portion 120. Advantageously, this automatic length compensation provides for enhanced manufacturing and assembly, as well as potentially tighter RF element spacing in arrays of RF feeds.

Advantageously, the particular structure and configuration of magic tee portion 120 and impedance matching element 125 are selected to provide enhanced manufacturability and operation when certain AM techniques are employed. For instance, impedance matching element 125 is formed having a triangular solid body as seen in view 302. The body has a thickness T1, which can correspond to a thickness that can support the mass/weight of impedance matching element 125, or a minimum thickness provided by the AM technique if sufficient. Impedance matching element 125 also has $\alpha$=45°, $\beta$=45°, and a right (90°) triangle configuration, corresponding to a 45-45-90 isosceles right triangle. As can be seen in certain views (e.g., FIG. 5), impedance matching element 125 has an overhang during a manufacturing process which forms hypotenuse H1. In this example, L1 and L2 are the same length, with H1 being $\sqrt{L1^{2}L2^{2}}$, although variations are possible for the individual leg lengths. This configuration of impedance matching element 125 forms a structurally robust triangle able to withstand the manufacturing process as well as produce an RF performance which makes magic tee portion 120 practical over a selected frequency range.

Variations in the $\alpha$ and $\beta$ angles (or relatedly, variations in L1/L2) can be selected according to manufacturability or performance desires. In the 45-45-90 isosceles right triangle example shown in view 302, a balance is achieved between RF performance and AM manufacturability. However, the $\beta$ angle can be selected to bias performance versus AM manufacturability and vice-versa. When the $\beta$ angle selected from 0-45°, then AM manufacturability is enhanced due in part to a lesser proportion of overhang in the horizontal (L1) direction for impedance matching element 125. When the $\beta$ angle is selected from 50-55°, impedance matching element 125 is more difficult to manufacture, but RF performance can be enhanced. As the $\beta$ angle approaches 90 degrees, RF performance is increased but the ability to AM manufacture impedance matching element 130 becomes nearly impractical due to impedance matching element 125 being almost entirely in the horizonal direction. Thus, a $\beta$ angle greater than 45° can increase RF performance, and less than or equal to 45° can increase AM manufacturability.

Figure 4:
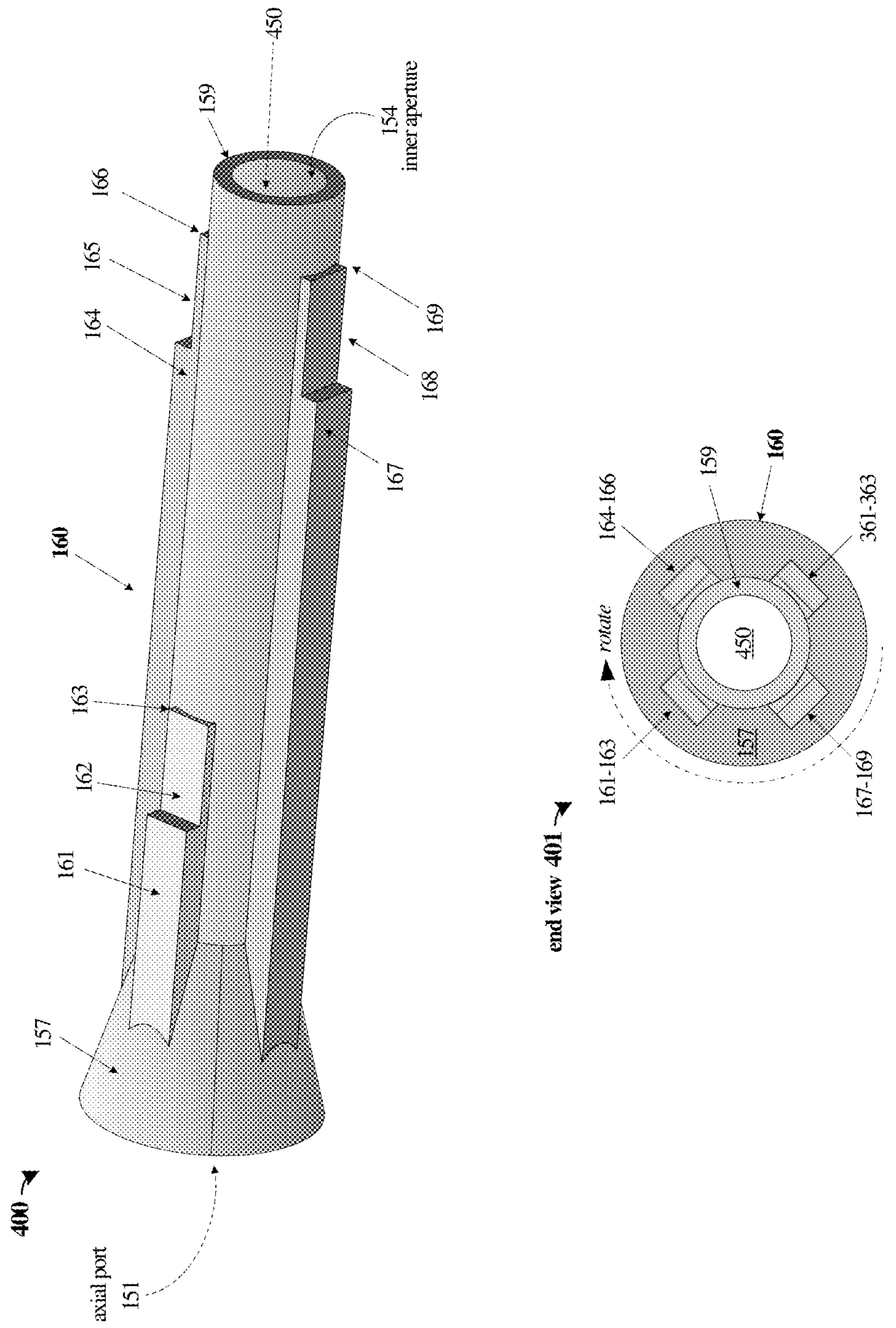
FIG. 4 illustrates a piston polarizer in an implementation.

FIG. 4 shows additional detailed views of piston polarizer element 160, which can be included in any of the aforementioned assemblies and waveguide structures, although variations are possible. View 400 includes piston polarizer element 160 shown in an isometric view separate from waveguide structure 110.

In view 400, axial port 151 along with inner aperture 154 can be seen, which are coupled by a circular waveguide conduit running the length of piston polarizer element 160. End view 401 shows this circular waveguide cavity, namely inner waveguide cavity 450. Piston polarizer element 160 provides inner waveguide cavity 450 (between inner waveguide aperture 154 and axial port 151) for pass-through of selected band RF signals. Although not required, a feed network can be attached at axial port 151. Inner waveguide cavity 450 provides for propagation of a selected RF band, typically of a higher frequency than the RF band handled by the outer surfaces of piston polarizer element 160.

Piston polarizer element 160 thus comprises a hollow ridged piston structure, typically positioned within polarizer portion 150. Piston polarizer element 160 can be configured to include no undercuts in the formation of the various structures, making it vertically 3D printable (or top machinable), as will be discussed in FIG. 5. Piston polarizer element 160 includes a conical segment 157 which couples and cantilevers piston polarizer element 160 from the floor of the waveguide cavity of polarizer section 150. When used in concert with recombination arms 130-131 and radial ports 152-153, outer waveguide cavity 158 and piston polarizer element 160 recombines RF signals split by magic tee portion 120 at colinear ports 123-124.

The dominant coaxial modes are phase shifted by piston polarizer element 160 using longitudinal ridges formed along the length of piston polarizer element 160. Four ridges are included, two (2) longer ridges and two (2) shorter ridges. The longer two ridges, namely ridges 164 and 167, provide phase shifting, and the shorter two ridges, namely ridges 161 and 361, provide power split handling. The ridges include stepped transitions from an initial height off of piston polarizer element 160 to eventually merge with piston polarizer element 160. Longitudinal ridge 161 has stepped feature 162 and terminal point 163. Longitudinal ridge 361 has stepped feature 362 and terminal point 363. Longitudinal ridge 164 has stepped feature 165 and termination point 166. Longitudinal ridge 167 has stepped feature 168 and termination point 169.

End view 401 also has visibility to all four (4) longitudinal ridges. Specifically, phase shifting longitudinal ridges 164 and 167 are shown as being on opposing angular sizes of piston polarizer element 160, and power splitting longitudinal ridges 161 and 361 are shown as being on opposing angular sizes of piston polarizer element 160. The lengths of the longitudinal ridges on piston polarizer element 160 can vary based on application, RF frequency ranges, and be tuned by empirical operation or simulated performance. Typically, the lengths are targeted to meet various functional parameters of piston polarizer element 160. For example, the long ridges (e.g., 164 and 167) are selected to be as short as possible to achieve the desired phase shift (e.g., 90°), and the short ridges (e.g., 161) are selected to be as short as possible to achieve the desired power split, although variations are possible. Piston polarizer element 160 might be clocked or rotated to arbitrary angles (e.g., +/−90°) in order to achieve either LHCP or RHCP over the selected frequency range. In some examples, piston polarizer element 160 is manufactured in a fixed selected position with respect to radial ports 152-153. However, other examples might have piston polarizer element 160 in a movable or rotatable configuration, such as with a coupling mechanism, such that it can be rotated about conical segment 157 to provide selectable orientations. A motor, servo, gearing mechanism, or other element can be included, along with corresponding control elements, to provide this selectable rotation.

FIG. 5 is now presented to show further view 500 of waveguide structure 110 under one example manufacturing implementation having a "build direction" as shown. Specifically, view 500 is a side view of waveguide structure 110 which highlights a manufacturing direction in an AM or 3D printing process. To manufacture or otherwise form waveguide structure 110, an AM process or technique can be employed, as mentioned herein. In one example technique, a print bed is employed from which features and structures can be additively manufactured one layer at a time. Print bed 510 is shown in FIG. 5 which indicates a base layer from which the remaining layers of waveguide structure 110 are formed. As noted above, the representation shown in FIGS. 1-3 are generally air cavity views, which do not represent actual material forming waveguide structural walls. Instead, the walls would be formed, such as in FIG. 6, to encompass the air cavity features. The exception to this view configuration is impedance matching element 125 and piston polarizer element 160 which represent the structural body and are not air cavity representations.

As waveguide structure 110 is formed using certain AM techniques, initial layers can include formation of port 122 on print bed 510 and then waveguide and port portions of magic tee portion 120 and recombination arms 130-131, followed by polarizer portion 150. Magic tee portion 120 forms a waveguide cavity that houses impedance matching element 125. Polarizer portion 160 forms a waveguide cavity that houses piston polarizer element 160. Impedance matching element 125 and piston polarizer element 160 can be formed along with the associated waveguide cavities and waveguide walls/floors in a single monolithic print. Print bed 510 can be incrementally raised for each layer formation, such as by deposition of powdered material that is selectively fused to form corresponding structures. In this manner, external overhang elements (such as for ports and arms) can be supported by the walls or floor of the waveguide structure or the bed material itself. Other build directions can be employed, such as inverted when polarizer portion 150 is formed first and then print bed 510 is incrementally lowered to form another layer.

However, internal components lack vertical support against their own horizontal weight and bending moments during a printing or AM process, such as for conventional impedance matching elements comprising thin and tall cylindrical rods or posts internal to the waveguide cavity. This prohibits usage of certain AM techniques for certain magic tee impedance matching elements. Internal supports, such as a lattice framework, could be printed or otherwise additively manufactured along with the impedance matching element. However, this would then require extensive post-processing to remove such internal supports which may not be achievable or successful for certain internal cavities and frequency ranges. Moreover, removal of internal supports might create extremely rough surfaces which reduce RF performance of waveguide cavities (i.e., increased insertion losses, RF power losses, RF heating, multipaction concerns, unwanted reflections, and bandwidth reduction), especially where post-processing surface smoothing is not practical or externally reachable.

Advantageously, the particular structure and configuration of waveguide structure 110, impedance matching element 125, and piston polarizer element 160 are selected to provide enhanced manufacturability and operation when certain AM techniques are employed. For instance, impedance matching element 125 is formed having a triangular solid body and piston polarizer element 160 is formed without overhangs and with tapered/conical 'base' segment 157. Conical segment 157 can provide more material to attach piston polarizer element 160 mechanically into polarizer portion 150, as well as assist in transitioning propagated RF energy from radial ports 152-153 to outer waveguide cavity 158, and reducing return losses (i.e., a measure of how much signal power is reflected due to impedance mismatches). The various elements and wall/floor thicknesses can correspond to a thickness that can support the mass/weight of impedance matching element 125, and a cantilevered piston polarizer element 160, or a minimum thickness provided by the AM technique if sufficient. Variations in the draft or overhang angles can be selected according to manufacturability or performance desires.

In the 45-45-90 isosceles right triangle example shown for impedance matching element 125, a balance is achieved between RF performance and AM manufacturability. However, the β angle (see view 302) can be selected to bias performance versus AM manufacturability and vice-versa. When the B angle selected from 0-45°, then AM manufacturability is enhanced due in part to a lesser proportion of overhang in the horizontal (L1) direction for impedance matching element 125. When the β angle is selected from 50-55°, impedance matching element 125 is more difficult to manufacture, but RF performance can be enhanced. As the β angle approaches 90 degrees, RF performance is increased but the ability to AM manufacture impedance matching element 125 becomes nearly impractical due to impedance matching element 125 being almost entirely in the horizonal direction. Thus, a β angle greater than 45° can increase RF performance, and less than or equal to 45° can increase AM manufacturability.

In an alternative to AM techniques or 3D printing, a machined process can be employed to form waveguide structure 110. In one example, a two-piece machined configuration is employed. In this example, piston polarizer element 160 might be formed separately and bolted, welded, or otherwise attached into outer waveguide cavity 158. Example machined materials include aluminum, among others mentioned herein.

FIG. 6 illustrates views 600 and 601 showing isometric manufactured views of waveguide structure 110. Waveguide structure 110 can be formed from a single material or workpiece as a monolithic construction, which may include AM techniques discussed herein. Thus, body 610 is shown encasing or enveloping the various air cavity structures of waveguide structure 110, along with internal components (e.g., impedance matching element 125 and piston polarizer element 160 (hidden from view)). Materials selected for body 610 and internal components include various conductive materials, such as metals, metal alloys, aluminum, copper, nickel, magnesium, steel, or other materials, including alloys thereof. In other examples, a non-conductive or polymer material can be employed for body 610 and internal components, with surface coatings, platings, or treatments used to apply a conductive layer onto RF-contacting surfaces. Thus, body 610 and internal components have internal/external surfaces which are conductive for RF energy propagated through corresponding waveguide cavities.

FIGS. 5 and 6 thus illustrate example methods of manufacturing a waveguide structure. This method of manufacturing can include forming a monolithic structure comprising a polarizer portion, a magic tee portion, and recombination arms using an additive manufacturing (AM) technique. In one example, the method of manufacturing can include forming a polarizer portion comprising an outer waveguide cavity comprising radial ports and an outer aperture, and disposed coaxially about a piston polarizer element housing an inner waveguide cavity. The piston polarizer element can comprise longitudinal ridges. The inner waveguide cavity can comprise an axial port and an inner aperture disposed coaxially with the outer aperture. The method of manufacturing can include forming a magic tee portion comprising a difference port, a sum port, and colinear ports. The method of manufacturing can include forming a magic tee waveguide cavity housing an impedance matching element, and forming recombination arms coupling the collinear ports of the magic tee portion to the radial ports of the polarizer portion. The piston polarizer element can comprise the longitudinal ridges spaced 90 degrees radially apart, with a first two of the longitudinal ridges having a length shorter than a second two of the longitudinal ridges. The impedance matching element can comprise an isosceles right triangular body and protruding perpendicularly from a wall of the magic tee waveguide cavity between the colinear ports.

Figure 7:
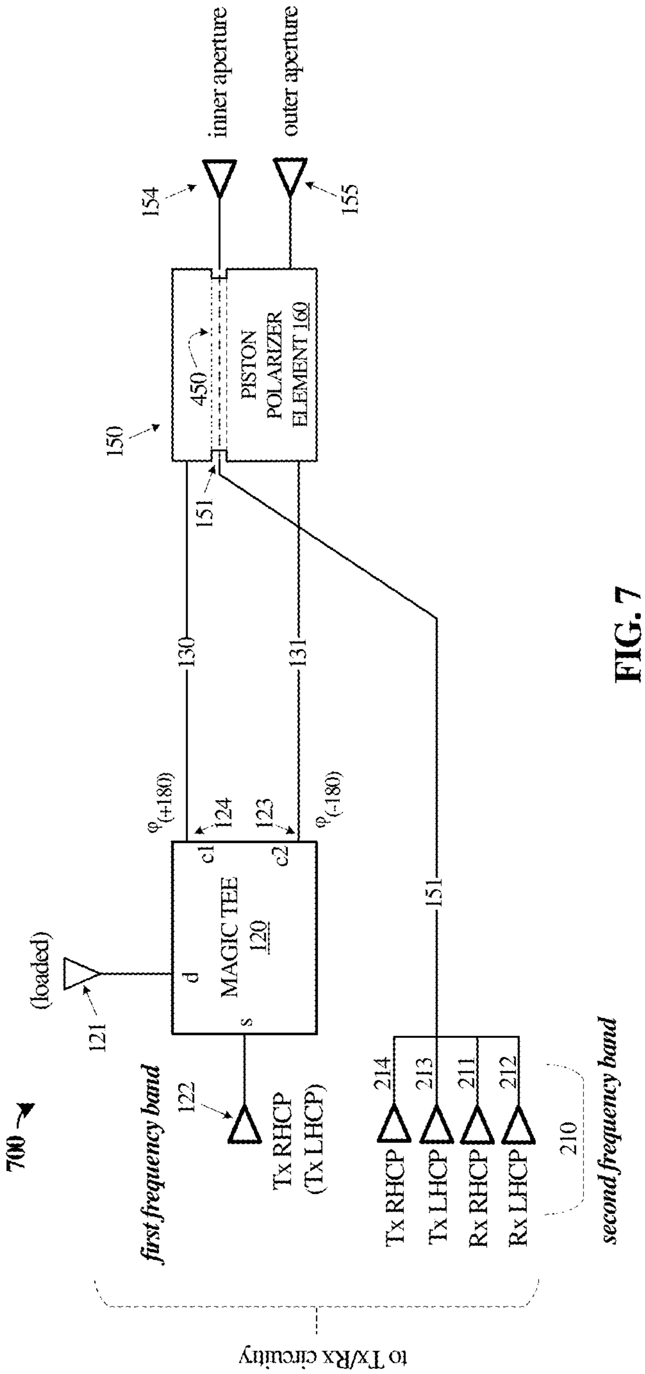
FIG. 7 illustrates a schematic view of a radio frequency feed structure in an implementation.

FIG. 7 illustrates schematic view 700 of a radio frequency feed structure in an implementation. In FIG. 7, two separate frequency bands or ranges are included, with separate RF handling sections employed for each band. Rx operations occur in the reverse flow as Tx operations. On the left-hand side of FIG. 7, various RF circuitry or equipment for Tx/Rx handling can be coupled over associated RF links, and this circuitry or equipment is omitted for clarity. On the right-hand side of FIG. 7, two apertures are shown which can couple to aperture antenna elements, such as horn antennas, patch antennas, or other antenna structure which might have a coaxial arrangement. In deployment, many instances of the RF arrangement can be included in an array. This array can provide beam shaping, ESA, or other RF functionality.

Turning now to the first RF frequency band, which may be an X band in some examples, common port 122 of magic tee portion 120 is shown which might carry Rx or Tx signals of a single polarization. In this example, a circular polarization can be employed, which may be RHCP or LHCP. Port 122 comprises a sum port(s) of magic tee portion 120 in this example, and energization of sum port 122, along with impedance loading of difference port (d) 121, can produce outputs of equal magnitude but opposite phase (e.g., 180 degrees out of phase, or φ) at collinear ports (c2 and c1, respectively) 123-124 and recombination arms 130-131. The output of difference port 122 has zero power (in the ideal case) and can be terminated by an RF load to absorb any imbalances due to manufacturing tolerances. The impedance of the load at port 122 can be of the same characteristic impedance of the other ports of magic tee portion 120, such as 50Ω, with a power handling capability to support the RF power levels carried by magic tee portion 120. From here, recombination arms 130-131 introduce the corresponding RF signals to radial ports of polarizer portion 150, and piston polarizer 160 produces phase shifting and power splitting to produce a signal at outer aperture 155.

For a second RF frequency band, such as a Ka band in some examples, ports 211-214 lead into an interior waveguide cavity or cavities of feed network 210. In this example, port 211 corresponds to RHCP Rx signaling. Port 212 corresponds to LHCP Rx signaling. Port 213 corresponds to LHCP Tx signaling. Port 214 corresponds to RHCP Tx signaling. Combined port 151 carries all signaling associated with ports 211-214, and is introduced through inner waveguide cavity 450 of piston polarizer element 160 to contact inner aperture 154.

Figure 8:
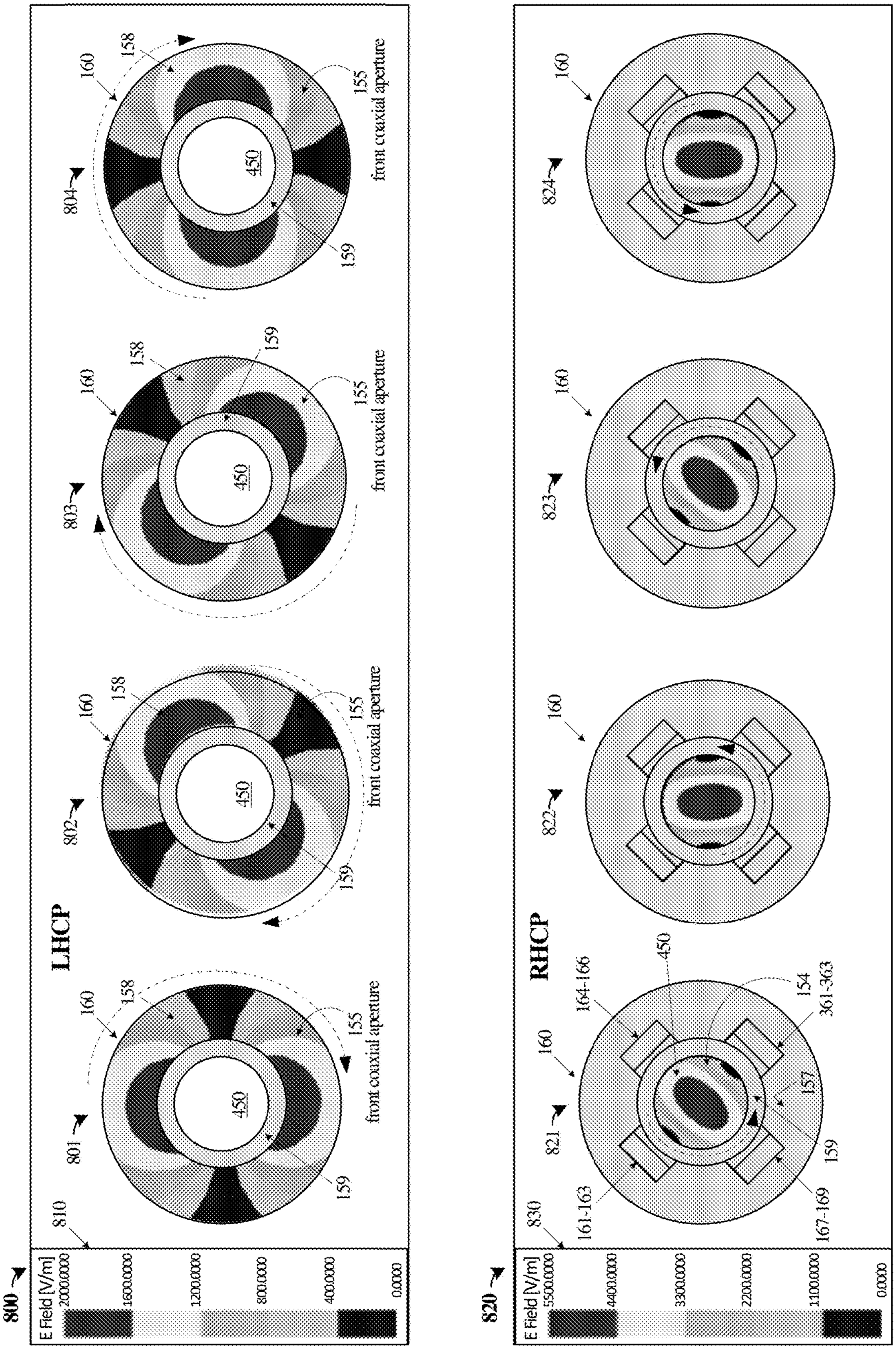
FIG. 8 illustrates performance characteristics of a radio frequency feed structure in an implementation.

FIG. 8 illustrates performance characteristics of a radio frequency feed structure in an implementation. The performance characteristics can relate to any of the waveguide structures discussed herein, such as for waveguide structure 110 with relation to outer waveguide cavity 158 and for inner waveguide cavity 450.

Turning first to performance diagram 800, various performance characteristics of outer waveguide cavity 158 are shown. In this example, an LHCP signal is transmitted (or received) via propagation through outer waveguide cavity 158. The electric (E) field strength in volts per meter (V/m)

is shown, which corresponds to a key or gauge on the left-hand side of performance diagram 800. Various features and elements are labeled in performance diagrams 801-804, and correspond to elements discussed above. In diagrams 801-804, the LHCP signal is shown to rotate over time (clockwise) which corresponds to the circular polarization with the TE11 propagation mode for X band RF signals. Similar characteristics would be exhibited for RHCP signals, albeit in the opposite circulation. Also, the viewpoint of diagrams 801-803 are from looking 'down' polarizer portion 150 from outer aperture 155.

In diagram 801, various E-field strengths are shown which have an initial orientation, and the orientations are shown to rotate in time to reach the configuration in diagram 802, diagram 803, and diagram 804, before returning the initial orientation in outer waveguide cavity 158. As the RF signal is transmitted, this operation and performance representation will continue/repeat.

Turning now to performance diagram 820, various performance characteristics of inner waveguide cavity 450 are shown. In this example, an RHCP signal is transmitted (or received) via propagation through inner waveguide cavity 450. The electric (E) field strength in volts per meter (V/m) is shown, which corresponds to a key or gauge on the left-hand side of performance diagram 820. Various features and elements are labeled in performance diagrams 821-824, and correspond to elements discussed above. In diagrams 821-824, the RHCP signal is shown to rotate over time (counterclockwise) which corresponds to the circular polarization with the TE11 propagation mode for Ka band RF signals. Similar characteristics would be exhibited for LHCP signals, albeit in the opposite circulation. Also, the viewpoint of diagrams 821-823 are from looking 'down' polarizer portion 150 from inner aperture 154.

In diagram 821, various E-field strengths are shown which have an initial orientation, and the orientations are shown to rotate in time to reach the configuration in diagram 822, diagram 823, and diagram 824, before returning the initial orientation in inner waveguide cavity 450. As the RF signal is transmitted, this operation and performance representation will continue/repeat.

Figure 9:
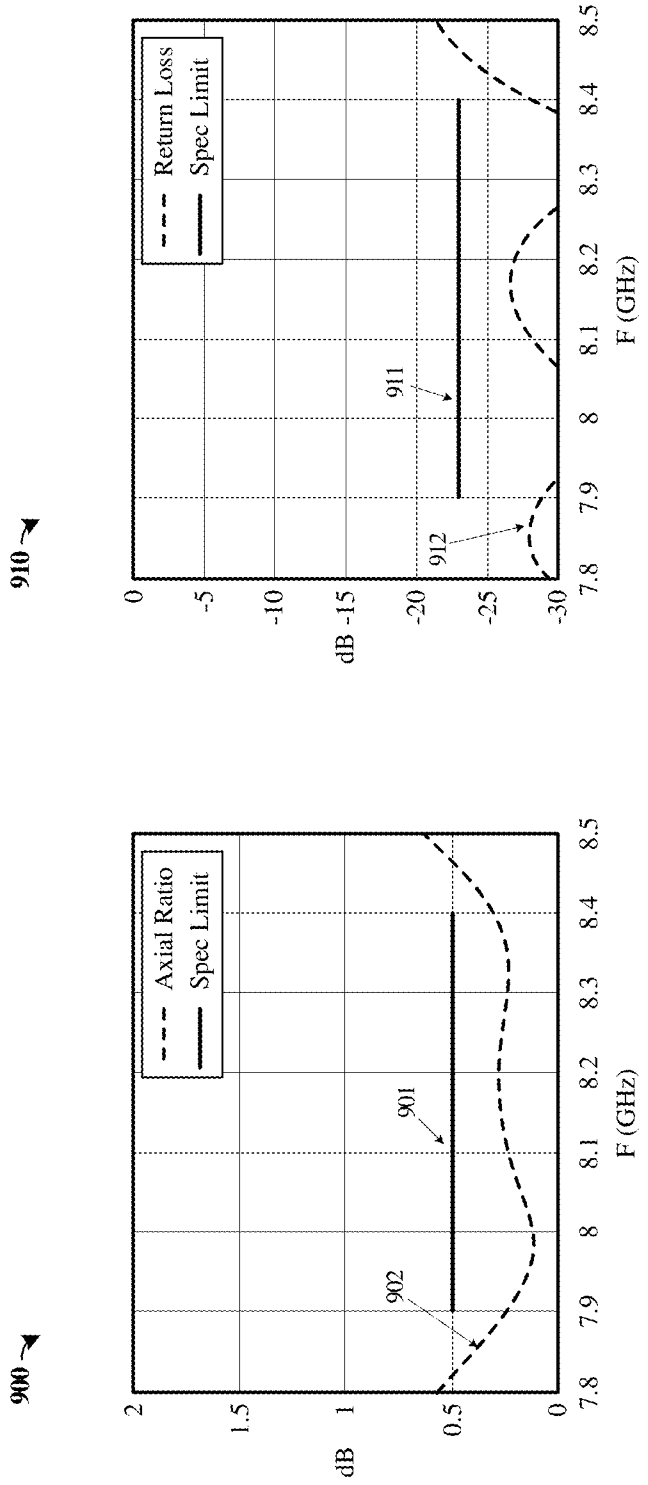
FIG. 9 illustrates performance characteristics of a radio frequency feed structure in an implementation.

FIG. 9 illustrates additional performance characteristics of a radio frequency feed structure in an implementation. The performance characteristics can relate to any of the waveguide structures discussed herein, such as for waveguide structure 110. Diagram 900 has specification limit 901 and performance curve 902. Performance curve shows axial ratio (i.e., measure of the ratio of a propagation shape of an electromagnetic wave among two axes) performance over a portion of the X band for waveguide structure 110, which exhibits under 0.5 decibels (abbreviated dB herein) axial ratio over 7.90-8.40 GHz, and is actually closer to 0.25 dB. Diagram 910 has specification limit 911 and performance curve 912. Performance curve shows return loss performance over a portion of the X band for waveguide structure 110, which exhibits >25 dB return loss over 7.90-8.40 GHz.

The example implementations and techniques herein describe various enhanced waveguide structures. In particular, a waveguide structure can include an outer waveguide cavity comprising radial ports and an outer aperture, and is disposed coaxially about a piston polarizer element housing an inner waveguide cavity. The piston polarizer element can comprise longitudinal ridges. The inner waveguide cavity can comprise an axial port and an inner aperture disposed coaxially with the outer aperture.

A magic tee element can be coupled to the aforementioned waveguide structure. The magic tee element can have a difference port, a sum port, and colinear ports coupled by recombination arms to the radial ports of the outer waveguide cavity. The magic tee element can comprise an impedance matching element comprising a triangular body disposed in a waveguide cavity of the magic tee element and protruding perpendicularly from a wall of the waveguide cavity of the magic tee between the colinear ports. The impedance matching element can comprise an isosceles right triangular body having a selected thickness and a hypotenuse face positioned toward the difference port and the sum port. In some examples, the isosceles right triangular body comprises leg faces positioned along longitudinal axes corresponding to the difference port and the sum port and the hypotenuse face subtending a right angle between the legs. In further examples, a first leg face is attached to the wall of the waveguide cavity of the magic tee element between the colinear ports and a second leg face and the hypotenuse face are detached from any wall of the waveguide cavity of the magic tee element. The sum port of the magic tee element can comprise a rectangular cross-sectional configuration, and the colinear ports and the difference port can each comprise pentagonal cross-sectional configurations establishing steeples having two sides shorter than remaining sides.

A feed structure can be mated to the aforementioned waveguide structure. This feed structure can have a plurality of waveguide ports with generally rectangular cross-sectional configurations. The feed structure can be configured to couple the plurality of waveguide ports to the axial port of the inner waveguide cavity having a generally circular cross-sectional configuration.

The piston polarizer element can comprise the longitudinal ridges spaced 90 degrees radially apart, with a first two of the longitudinal ridges having a length shorter than a second two of the longitudinal ridges. The piston polarizer element can be configured to be rotatable within the outer waveguide cavity with respect to the radial ports to alter polarization characteristics of radio frequency signals propagated by the outer waveguide cavity. The inner waveguide cavity can be configured to propagate radio frequency energy of a first frequency range among the inner aperture and the axial port. The outer waveguide cavity can be configured to propagate radio frequency energy of a second frequency range among the outer aperture and the radial ports.

The various waveguide cavities and ports discussed herein can also couple to further external components, waveguides, and other elements via standardized waveguide flanges or can employ fasteners, welds, clamps, and the like. Advantageously, the examples herein can provide a monolithic AM-manufactured magic tee, recombination arm, and polarizer configurations comprising an impendence matching element and piston polarizer element disposed within the waveguide cavities which are defined by waveguide walls.

The frequency ranges for RF waveguides, components, configurations, systems, and arrangements herein include various RF bands, such as microwave frequencies capable of transiting RF waveguide structures. Different frequency bands can be supported by similar architectures as shown herein, with associated geometry scaling to suit the selected frequency ranges. While the examples herein cover portions of the RF bands noted above, examples might include the X band (approximately 8 to 12 GHZ), or the Ka band and Ku band or other portions of the K bands (approximately 12 to 40 GHZ). Other examples might be configured to support frequency ranges, or portions thereof, corresponding to the IEEE bands of S band, L band, C band, X band, Ku band, K band, Ka band, V band, W band, among others, including combinations thereof. Other example RF frequency ranges and service types include ultra-high frequency (UHF), super high frequency (SHF), extremely high frequency (EHF), or other parameters defined by different organizations. In addition, various frequency bands associated with communication technology, such as Wi-Fi and 4G/5G cellular communications can be employed. These include the IEEE 802.11 family of frequency bands (Wi-Fi), and the 4G/5G broadband cellular network frequency bands including the low band (600 to 700 MHz), mid band (1.7 GHz to 2.5 GHz), high band (24 to 100 GHz (mmWave)) defined by the 3rd Generation Partnership Project (3GPP) and other organizations.

The functional block diagrams, operational scenarios and sequences, and flow diagrams provided in the Figures are representative of exemplary systems, environments, and methodologies for performing novel aspects of the disclosure. While, for purposes of simplicity of explanation, methods included herein may be in the form of a functional diagram, operational scenario or sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The various materials and manufacturing processes discussed herein are employed according to the descriptions above. However, it should be understood that the disclosures and enhancements herein are not limited to these materials and manufacturing processes, and can be applicable across a range of suitable materials and manufacturing processes. Thus, the descriptions and figures included herein depict specific implementations to teach those skilled in the art how to make and use the best options. For the purpose of teaching inventive principles, some conventional aspects have been simplified or omitted. Those skilled in the art will appreciate variations from these implementations that fall within the scope of this disclosure. Those skilled in the art will also appreciate that the features described above can be combined in various ways to form multiple implementations.

What is claimed is:

1. A waveguide structure, comprising:

an outer waveguide cavity comprising radial ports and an outer aperture, and disposed coaxially about a piston polarizer element housing an inner waveguide cavity;

the piston polarizer element comprising longitudinal ridges; and the inner waveguide cavity comprising an axial port and an inner aperture disposed coaxially with the outer aperture.

2. The waveguide structure of claim 1, wherein the piston polarizer element comprises the longitudinal ridges spaced 90 degrees radially apart, with a first two of the longitudinal ridges having a length shorter than a second two of the longitudinal ridges.

3. The waveguide structure of claim 1, wherein the piston polarizer element is rotatable within the outer waveguide cavity with respect to the radial ports to alter polarization characteristics of radio frequency signals propagated by the outer waveguide cavity.

4. The waveguide structure of claim 1, comprising:

a feed structure having a plurality of waveguide ports having generally rectangular cross-sectional configurations; and wherein the feed structure is configured to couple the plurality of waveguide ports to the axial port of the inner waveguide cavity having a generally circular cross-sectional configuration.

5. The waveguide structure of claim 1, comprising:

a magic tee element having a difference port, a sum port, and colinear ports coupled by recombination arms to the radial ports of the outer waveguide cavity.

6. The waveguide structure of claim 5, wherein the inner waveguide cavity is configured to propagate radio frequency energy of a first frequency range among the inner aperture and the axial port; and wherein the outer waveguide cavity is configured to propagate radio frequency energy of a second frequency range between the outer aperture and the radial ports.

7. The waveguide structure of claim 5, wherein the magic tee element comprises:

an impedance matching element comprising a triangular body disposed in a waveguide cavity of the magic tee element and protruding perpendicularly from a wall of the waveguide cavity of the magic tee between the colinear ports.

8. The waveguide structure of claim 5, wherein the sum port of the magic tee element comprises a rectangular cross-sectional configuration, and the colinear ports and the difference port each comprise pentagonal cross-sectional configurations establishing steeples having two sides shorter than remaining sides.

9. The waveguide structure of claim 5, comprising a monolithic structure comprising the magic tee element, the recombination arms, and the piston polarizer element.

10. An assembly, comprising:

a polarizer portion comprising:

an outer waveguide cavity comprising radial ports and an outer aperture, and disposed coaxially about a piston polarizer element housing an inner waveguide cavity;

the piston polarizer element comprising longitudinal ridges; and the inner waveguide cavity comprising an axial port and an inner aperture disposed coaxially with the outer aperture; and a magic tee portion comprising:

a difference port, a sum port, and colinear ports; and a magic tee waveguide cavity housing an impedance matching element; and recombination arms coupling the collinear ports of the magic tee portion to the radial ports of the polarizer portion.

11. The assembly of claim 10 formed using an additive manufacturing technique into a monolithic workpiece.

12. The assembly of claim 10, wherein the piston polarizer element comprises the longitudinal ridges spaced 90 degrees radially apart, with a first two of the longitudinal ridges having a length shorter than a second two of the longitudinal ridges.

13. The assembly of claim 10, wherein the piston polarizer element is rotatable within the outer waveguide cavity with respect to the radial ports to alter polarization characteristics of radio frequency signals propagated by the outer waveguide cavity.

14. The assembly of claim 10, wherein the inner waveguide cavity is configured to propagate radio frequency energy of a first frequency range among the inner aperture and the axial port; and wherein the outer waveguide cavity is configured to propagate radio frequency energy of a second frequency range between the outer aperture and the radial ports.

15. The assembly of claim 10, wherein the impedance matching element comprises an isosceles right triangular body and protruding perpendicularly from a wall of the magic tee waveguide cavity between the colinear ports.

16. The assembly of claim 10, wherein the sum port of the magic tee portion comprises a rectangular cross-sectional configuration, and the colinear ports and the difference port each comprise pentagonal cross-sectional configurations establishing steeples having two sides shorter than remaining sides.

17. The assembly of claim 10, comprising:

a feed structure having a plurality of waveguide ports having generally rectangular cross-sectional configurations; and wherein the feed structure is configured to couple the plurality of waveguide ports to the axial port of the inner waveguide cavity having a generally circular cross-sectional configuration.

18. A method, comprising:

forming a polarizer portion comprising:

an outer waveguide cavity comprising radial ports and an outer aperture, and disposed coaxially about a piston polarizer element housing an inner waveguide cavity;

the piston polarizer element comprising longitudinal ridges; and the inner waveguide cavity comprising an axial port and an inner aperture disposed coaxially with the outer aperture; and forming a magic tee portion comprising:

a difference port, a sum port, and colinear ports; and a magic tee waveguide cavity housing an impedance matching element; and forming recombination arms coupling the collinear ports of the magic tee portion to the radial ports of the polarizer portion.

19. The method of claim 18, wherein the piston polarizer element comprises the longitudinal ridges spaced 90 degrees radially apart, with a first two of the longitudinal ridges having a length shorter than a second two of the longitudinal ridges; and wherein the impedance matching element comprises an isosceles right triangular body and protruding perpendicularly from a wall of the magic tee waveguide cavity between the colinear ports.

20. The method of claim 18, comprising:

forming a monolithic structure comprising the polarizer portion, the magic tee portion, and the recombination arms using an additive manufacturing technique.

* * * * *